Patented May 22, 1951

2,553,578

UNITED STATES PATENT OFFICE 2,553,578

MILK POWDER AND ITS PREPARATION

Francis Frederick Hansen, Pittsburgh, Pa.

No Drawing. Application November 6, 1945, Serial No. 627,094

5 Claims. (Cl. 99—56)

In the baking industry, enormous quantities of milk are employed in the baking of bread and cakes, the milk being employed usually in the form of milk powders prepared from either whole milk, skim milk, or buttermilk. Considerable difficulty is experienced, however, in obtaining dispersion of the milk powders into the dough in which the milk powders form a constituent.

According to the present invention, milk powder is so treated as to render it more easily distributed through a baking mix and also improve the keeping qualities of the milk powder. The improved milk powder imparts to the finished baked goods improved oven-spring, more volume, better texture, longer retension of moisture after baking, thinner gluten vesicles, softer texture in the package and a better crumb color than does ordinary powdered milk.

The invention is predicated upon the discovery that these improved properties in the baked products, together with improved incorporation of the milk powders into the dough mixes, coupled with improved keeping qualities of the milk powders, are obtained by incorporating in the milk, whether it be liquid whole milk or skim milk or buttermilk, prior to drying into powder, stabilized calcium acid lactate and calcium lacto-phosphate.

Stabilized calcium acid lactate is obtained by partially neutralizing lactic acid with a neutralizing calcium material, such as calcium carbonate or calcium hydroxide. In view of the fact that it is extremely difficult to obtain one hundred per cent lactic acid, it is preferred to use either eighty-five per cent lactic acid, or a fifty per cent lactic acid, such concentrations being readily obtainable on the market in edible purities. Either of the concentrations of the lactic acid is employed on the basis of three hundred parts by weight of the lactic acid of edible purity, together with one hundred parts by weight of pure edible calcium carbonate.

That is to say, nine mols of pure lactic acid are reacted with three mols of pure calcium carbonate. It is found in practice that the fifty per cent lactic acid is more preferable for the production of stabilized calcium acid lactate than is the eighty-five per cent strength of lactic acid. Thus, for example, 1642 grams of fifty per cent edible lactic acid are reacted with 302 grams of pure calcium carbonate in the presence of 415 grams of corn starch and 450 grams of calcium sulphate. There results from the reaction 2026 grams of stabilized calcium acid lactate, when dehydrated and finely ground to two hundred mesh.

The 2026 grams of stabilized calcium acid lactate is composed of 931 grams of calcium acid lactate plus 865 grams of filler (415 grams of starch and 450 grams of calcium sulphate) plus 230 grams of bound (chemically combined) water. This water is not removed by dehydration, but remains in the product as bound, or chemically combined, water. These proportional parts are based on pure lactic acid and pure calcium carbonate. Since one hundred per cent lactic acid is not readily available, as above explained, a larger proportion of weaker lactic acids must be used based on the percentage of purity. The calcium carbonate and lactic acid are mixed with heat and stirring, carbon dioxide and water being produced in the reaction.

The resulting product normally is very unstable and highly hygroscopic in character, but a stable product may be obtained by adding calcium sulphate and starch to the reacting mixture of lactic acid and calcium carbonate, the calcium sulphate and starch being added directly into the reacting mass, while continuing the stirring. The resulting mass of material then is dehydrated either in the open or under vacuum until it contains less than three per cent of free moisture. The material then is suitably comminuted in a hammer mill, or otherwise, to a fineness of 200-mesh, or finer. The resulting finely comminuted material is fluffy in character, and has a high bulk factor.

The "calcium lacto-phosphate," which is also added to the liquid milk before dehydration of the milk for the obtaining of the above-described desirable properties, is not a definite chemical compound, but actually is a mixture of mono-calcium acid phosphate and the reaction product of the neutralization of lactic acid with neutralizing calcium compounds such as calcium carbonate or calcium hydroxide. This neutralization product is, as has been set forth above, substantially equal molecular parts of normal calcium lactate and calcium acid lactate. To this reaction mixture there are added from three to five per cent of mono-calcium acid phosphate. The resulting material is dried and comminuted to 200-mesh or finer, and the resulting calcium lacto-phosphate is fluffy in character and has a high bulk factor.

The preparation of calcium acid lactate and calcium lacto-phosphate is described in my co-pending applications Serial Numbers 607,673, filed July 28, 1945, and 599,119, filed June 12, 1945, respectively.

In accordance with the present invention, there are incorporated from approximately one per cent to approximately five per cent of the stabilized calcium acid lactate or calcium lacto-phosphate into powdered milks, the addition of the calcium acid lactate or calcium lacto-phosphate being made, however, to the liquid milk prior to drying for the production of either spray dried or roller dried milk powders, the additions being made so that the milk powders produced from the mixture will contain from substantially one per cent to substantially five per cent of the mixture of calcium acid lactate or calcium lacto-phosphate.

These percentages refer to the amount of actual calcium acid lactate or calcium lacto-phosphate, apart from fillers and drying agents such as starch and calcium sulphate. The prescribed percentages of these materials are added to the liquid milk, stirring vigorously for several minutes and then running the mixture through homogenizers or colloidal mills for complete distribution of all ingredients. The calcium lacto-phosphate employed for the purposes of the present invention is the same as described in National Formulary No. 5, and is totally water-soluble. Likewise, the stabilized calcium acid lactate is edible grade and is completely water-soluble.

The improved properties imparted to the finished baked goods in which are incorporated the milk powders conditioned by the addition of calcium acid lactate or calcium lacto-phosphate apparently result from the buffering action of the calcium acid lactate or calcium lacto-phosphate. By this buffering action is meant that the hydrogen ion concentration is preserved against any alkalinizing action in the presence of these calcium salts. Both of these calcium salts, being very light and fluffy in their dehydrated and finely comminuted form, protect the caseins, albumins, and fats from oxidation, surrounding the particles of such materials in powdered milk with a film of the calcium salts.

It is well known that all milk powders deteriorate quite rapidly due to oxidation, and to reduce this objectionable effect, they are stored in moisture-proof and air-proof lined containers. It is found, in accordance with the present invention, that the presence of calcium acid lactate or calcium lacto-phosphate and the high coverage factor of the salts on the dried milk ingredients prolongs freshness greatly, reducing the normal oxidation of the milk powders by coating the milk particles and thereby reducing the surface areas of the milk powders that are exposed to oxidation, both the calcium acid lactate and the calcium lacto-phosphate being inert or inactive in themselves to atmospheric oxidation.

As has been noted above, it is preferred to add the calcium acid lactate or the calcium lacto-phosphate in their dehydrated finely comminuted form to liquid milk. It has been shown in practicing the present invention that highly superior results in keeping qualities of powdered milks are obtained by adding these salts to the liquid milk before drying. Since water-soluble calcium acid lactate or calcium lacto-phosphate is used, these compounds dissolve readily in liquid milk, and to assure complete dispersion of these salts in the milk, the mixture of salts and milk is homogenized or passed through high velocity colloidal mills for the same purpose. In this way, when the milk is dried, the calcium salts are thoroughly dispersed through the dried milk components of caseins, albumens, fats and minerals. Since these calcium salts have a high bulk character when dried, they impart to the dried milk a much greater bulk than the milk powders have in the absence of such calcium salts; and since these calcium salts are very soluble in water, and being distributed thoroughly throughout the milk particles, they cause the powdered milk to dissolve more readily when contacting water, thus, increasing solubility in baking.

All milk powders, but more especially those produced by the roller process than by the spray process, are resistant and sluggish to solubility in water. They hydrate slowly requiring several minutes for reconstitution with rapid stirring into a normal milk emulsion state. One cause for some insolubility and slow solubility is caused by a disturbance in particle charge or calcium-casein balance brought about by heat used in drying the milk. Research has proven that heat used in dehydrating and drying liquid milk precipitates some the calcium phosphate present as normal mineral salts in liquid milk. Such precipitation of calcium phosphate disturbs the calcium-casein balance or salt factor and thus impairs the stability of the casein. Tests have proven that the water soluble stabilized calcium acid lactate or calcium lacto-phosphate when dissolved in liquid milk before drying either by the roller or by the spray process, reduces the tendency for calcium phosphate precipitation during dehydration of the milk by heat, thus improving the solubility of all milk powders produced under this process. The calcium acid lactate or the calcium lacto-phosphate is much more soluble in water than the milk powder components, and the complete dispersion throughout the milk powder prevents that caking of the milk powder when contacting water so frequently encountered in using milk powders since the dispersion of the calcium acid lactate or the calcium lacto-phosphate serves as contact points for the water to enter the milk powder mass.

Research chemists in the powdered milk industry unanimously agree that caking of dried milk in the container after packing is caused chiefly by the action of the milk sugar which is believed to be present in the dried milk in the form of a very concentrated syrup. This concentrated lactose syrup absorbs moisture, facilitating adherence of the milk particles to one another, causing lumping or caking. Milk, when once caked, is difficult to use in the baking industry because it is difficult to dissolve in the dough or batter. Such caking action is followed or accompanied by the crystallization of some of the lactose sugar as alpha hydrate, causing solidification of the mass. These tests prove that when water-soluble stabilized calcium acid lactate or calcium lacto-phosphate is added to liquid milk before drying, they are so completely dispersed in the dried product that they reduce the tendency of lactose syrup from absorbing moisture with resulting caking characteristics, and likewise, the said calcium acid lactate and calcium lacto-phosphate prevent close adherence of the milk particles, thus reducing caking tendencies.

While it is greatly preferred to add the calcium acid lactate or calcium lacto-phosphate to the liquid milk before drying milk to powder, these compounds may be incorporated into the milk powders themselves after drying by adding the calcium acid lactate or the calcium lacto-phosphate in highly comminuted form to the milk powder and physically intermixing there-with. It is recommended in such instance to use the optimum percentage of three per cent of either of the said calcium compounds (actual compound without filler or drying agent), or a combination of both to make up the total of three per cent.

From the standpoint of the improved baking characteristics contributed by either calcium acid lactate or calcium lacto-phosphate, the same results will accrue whether added to liquid milk before drying or to powdered milk after drying. But there is a great difference in solubility of powdered milk, when these salts are added to liquid milk before drying because of their more minute distribution through each particle; and the keeping properties of the dried milks are much better when these salts are added to the liquid milk; and their value as coverage substances against humidification and oxidation is much greater when the salts are added to the liquid milk before drying than when added in a physical mix after the milk has dried.

In this connection, it may be noted that rancidity oxidation of milk powders is accelerated in increasing moisture or humidity. Calcium acid lactate or calcium lacto-phosphate, being a part of these milk powders, retards oxidation from increased humidity by its selective hygroscopic action. These calcium salts are much more hydrophilic than any of the other milk ingredients, therefore, when they are so completely disbursed throughout the milk powder as they become when added to the liquid milk before drying, they act as contact points for adsorption and absorption of any excess moisture, thus keeping this moisture from accelerating oxidation of the milk particles, particularly those carrying the fats, lipids and lipoids which are so susceptible to any oxidation, resulting in their being split into free fatty acids and subsequent rancidification that follows such chemical breakdowns of fats and oils.

Calcium acid lactate and calcium lacto-phosphate, when present in milk powders, also contribute a valuable action through the acid content which they possess. It is well known in the baking industry that best bakery products are produced when the dough mass has a pH value of from 5 to 5.25. Freshly milled flour has a pH value of from 6 to 6.5, depending upon the age of the wheat from which the flour was milled. To obtain optimum baking results, therefore, the lower pH value desired must be obtained through fermentation. This fermentation produces carbonic acid gas, lactic acid, and acetic acid, but the fermentation requires considerable time and elevated temperatures which contribute to the loss of many desirable fermentation flavors. The use of the calcium acid lactate or calcium lacto-phosphate contributes valuable action to the production of a proper pH value for best results in the dough mass.

In the use of these salts, it is possible to use a vigorous fermentation and at the same time preserve the full flavor. By carrying on a sufficiently vigorous fermentation in the ordinary manner to obtain optimum pH values, there is likelihood of destroying the delicate flavors of fermentation that are desired in the finished product. Bread or rolls made from a young fermentation having a higher pH value have the most desirable flavor, but they are off-set by the lack of keeping properties of the finished product and the usual small volume attendant to such a process. Therefore, in normal practice the baking industry sacrifices flavor in order to obtain larger volume and longer keeping properties in the finished goods, naturally the larger the volume, the softer the finished product feels in the package.

However, as has been pointed out above, in the use of the calcium acid lactate or calcium lacto-phosphate as conditioning agents for the milk powders, it is possible to use a vigorous fermentation without any sacrifice of full flavor. It is very difficult without the use of these salts to ferment the doughs to a pH value of 5, and at the same time retain an acceptable flavor in the finished product; but this can be attained readily by the use of these compounds.

It may be mentioned also that since calcium acid lactate and calcium lacto-phosphate are so highly water-soluble, they increase the viscosity of the dough, this increase in viscosity being a natural characteristic of all soluble calcium salts in wheat flour doughs. Increased viscosity causes a need for more water in the dough for proper consistency. This increases the yield of baked goods, and longer freshness of such baked goods since higher moisture content prolongs freshness. These soluble calcium salts also are natural yeast foods, and therefore contribute valuable aid in yeast action in the dough through their water-soluble calcium ions that are universally recognized as yeast stimulants or yeast foods.

It is the customary opinion in the baking industry that milk powders when used in bread or rolls, reduce oven-spring and volume. Therefore, to minimize such difficulties, it is the customary practice to employ older doughs, more yeast food, more yeast, more time, and higher temperatures in order to prevent loss of volume. In carrying out such practice, much flavor is lost, but in the use of the calcium salt as herein described, the effect of increased oven spring and improved volume are obtained without requiring such extensive aging as has been necessary heretofore.

While it is found in practice that the desirable effects of the presence of calcium acid lactate or calcium lacto-phosphate are obtained by incorporating these compounds in the liquid milk so as to produce a content thereof of from one per cent to five per cent in the milk powders obtained from evaporation of the liquid constituents of the milk, it is found in practice that the optimum content of the calcium lacto-phosphate in the milk powder is substantially three per cent by weight of the milk powder, and also, the optimum percentage of calcium acid lactate in the milk powder is substantially three per cent.

I claim:

1. As a new composition, milk powder containing from approximately one to approximately five per cent of a calcium salt selected from the group consisting of calcium acid lactate and calcium lacto-phosphate together with corn starch and calcium sulphate as stabilizing agents.

2. A composition of matter for use in baking, which comprises milk powder and effective amounts of calcium acid lactate stabilized with soluble starch and calcium sulfate in approximately equal amounts, the said milk powder having its particles substantially encased in the said stabilized calcium acid lactate for inhibiting humidification and oxidation of the milk powder.

3. A composition of matter for use in baking, comprising milk powder containing calcium acid lactate stabilized with soluble starch and calcium sulfate in approximately equal amounts, said calcium acid lactate being present in effective amounts up to approximately five per cent of actual calcium acid lactate for inhibiting humidification and rancidification of the milk powder.

4. The method of preparing milk powder which comprises producing edible calcium acid lactate by partially neutralizing pure lactic acid of approximately 50% strength with calcium carbonate, stabilizing the resulting calcium acid lactate by incorporating therein a starch and calcium sulphate, adding the resulting stabilized calcium acid lactate to a liquid milk, evaporating the liquid milk to dryness, and reducing the resulting dried milk to powder, the resulting powdered milk containing from substantially one per cent to substantially five per cent of actual calcium acid lactate.

5. The process of preparing milk powder which comprises reacting 50% edible lactic acid with calcium carbonate in the ratio of about 642 grams of the 50% lactic acid to 302 grams of calcium carbonate in the presence of corn starch and calcium sulfate as stabilizing agents in the ratio of approximately 415 grams of corn starch to 450 grams of calcium sulfate, dehydrating the resulting product, incorporating the same into milk, and reducing the milk to a powder.

FRANCIS FREDERICK HANSEN.

REFERENCES CITED

The following references are of record in the file of this patent:

UNITED STATES PATENTS

| Number | Name | Date |
| --- | --- | --- |
| 1,282,868 | Kohman | Oct. 29, 1918 |
| 1,322,561 | Grelck | Nov. 25, 1919 |
| 1,500,545 | Buffington | July 18, 1924 |
| 1,559,330 | Lowy | Oct. 27, 1925 |
| 1,970,306 | Hanack | Aug. 14, 1934 |

FOREIGN PATENTS

| Number | Country | Date |
| --- | --- | --- |
| 17,486 | Great Britain | of 1902 |